United States Patent [19]

Ehrfeld et al.

[11] Patent Number: 4,514,095
[45] Date of Patent: Apr. 30, 1985

[54] MOTIONLESS MIXER

[75] Inventors: Wolfgang Ehrfeld; Gunther Krieg, both of Karlsruhe, Fed. Rep. of Germany

[73] Assignee: Kernforschungszentrum Karlsruhe GmbH, Karlsruhe, Fed. Rep. of Germany

[21] Appl. No.: 549,179

[22] Filed: Nov. 4, 1983

[30] Foreign Application Priority Data

Nov. 6, 1982 [DE] Fed. Rep. of Germany ....... 3241089

[51] Int. Cl.³ .............................................. B01F 5/06
[52] U.S. Cl. ...................................... 366/340; 138/42
[58] Field of Search .................. 366/336, 340; 138/42; 137/896; 48/189.4, 189.6

[56] References Cited

U.S. PATENT DOCUMENTS

| 2,561,457 | 7/1951 | Beales et al. | 138/42 X |
|---|---|---|---|
| 2,567,998 | 9/1951 | Griffith | 138/42 |
| 2,618,539 | 11/1952 | Conta et al. | 48/180 R |
| 2,639,230 | 5/1953 | LeFebre | 48/180 R |
| 3,295,552 | 1/1967 | Powell et al. | 137/896 |
| 3,855,368 | 12/1974 | Prochazka et al. | 366/340 X |
| 4,135,180 | 1/1979 | White | 366/336 |
| 4,313,680 | 2/1982 | Honnen | 366/340 X |
| 4,361,407 | 11/1982 | Pellegrini | 366/340 |

FOREIGN PATENT DOCUMENTS

| 1901281 | 6/1970 | Fed. Rep. of Germany . | |
|---|---|---|---|
| 1243778 | 9/1960 | France | 138/42 |
| 725689 | 4/1980 | U.S.S.R. | 366/336 |
| 746156 | 7/1980 | U.S.S.R. | 138/42 |

Primary Examiner—Philip R. Coe
Assistant Examiner—Frankie L. Stinson
Attorney, Agent, or Firm—Spencer & Frank

[57] ABSTRACT

A motionless mixer has a tubular casing, a fluid inlet and a fluid outlet axially spaced from one another in the casing and defining a flow direction of the fluid, a plurality of discs each having throughgoing apertures for allowing passage of the fluid. The discs have a periphery conforming to the inner cross-sectional contour of the casing. The discs are supported in the casing in a face-to-face oriented relationship to form an axially extending disc stack. The apertures in the discs form a core channel and fringe channels in the stack for dividing a fluid stream into a core stream and fringe streams in a first zone, for dividing the core stream into fringe streams in a second zone and for centripetally combining the fringe streams into a central stream in a third zone. A mechanism prevents the discs from angular displacements relative to one another.

5 Claims, 2 Drawing Figures

FIG. I

MOTIONLESS MIXER

BACKGROUND OF THE INVENTION

This invention relates to a motionless mixer to blend a flowable material (hereafter fluid). The mixer, which may be supported in a tube, first divides the flowing fluid into core and fringe streams by means of channels and thereafter guides the core stream into a boundary zone and the boundary stream into a core zone.

A mixer of the above-outlined type is known and is disclosed, for example, in German Offenlegungsschrift (application published without examination) No. 1,901,281. The mixer shown in that publication comprises a bulky structural component which contains obliquely oriented ports (channels) that connect the core zone at the flow inlet side with the fringe zone at the outflow side and connects the fringe zones at the inflow side with the core zone at the outflow side. The single-piece mixer block thus has a three-dimensional geometry which is complex and expensive to manufacture.

SUMMARY OF THE INVENTION

It is an object of the invention to provide an improved motionless mixer of the above-outlined type which is very simple to manufacture and which has a relatively small structural height. It is furthermore an object of the invention to provide an improved motionless mixer which is simple to service and is particularly easy to clean.

These objects and others to become apparent as the specification progresses, are accomplished by the invention, according to which, briefly stated, the motionless mixer has a tubular casing, a fluid inlet and a fluid outlet axially spaced from one another in the casing and defining a flow direction of the fluid, a plurality of discs each having throughgoing apertures for allowing passage of the fluid. The discs have a periphery conforming to the inner cross-sectional contour of the casing. The discs are supported in the casing in a face-to-face oriented relationship to form an axially extending disc stack. The apertures in the discs form a core channel and fringe channels in the stack for dividing a fluid stream into a core stream and fringe streams in a first zone, for dividing the core stream into fringe streams in a second zone and for centripetally combining the fringe streams into a central stream in a third zone. A mechanism prevents the discs from angular displacements relative to one another.

Thus, according to the invention, the mixer is formed only of structural elements which have, for all practical purposes, a two-dimensional geometry and which may be manufactured by conventional machine tools without additional special devices. Obliquely oriented ports are avoided or, stated differently, the openings or ports in each disc extend from the opposite disc faces parallel to the disc axis (that is, perpendicularly to the opposite disc faces). Thus, the components may be mass-produced with a stamping (cutting) operation. The structural height of the mixer depends only from the selected thickness of the individual discs and may therefore be maintained very low. The discs may be cleaned in a simple manner, for example, by submerging them in a bath. By means of the centripetal merging of the edge streams from all sides a particularly good mixing effect may be achieved. Such an effect is, according to a further feature of the invention, increased by the provision of web structures inducing a twist in the fluid stream.

DESCRIPTION OF THE PREFERRED EMBODIMENT

Figure 1:
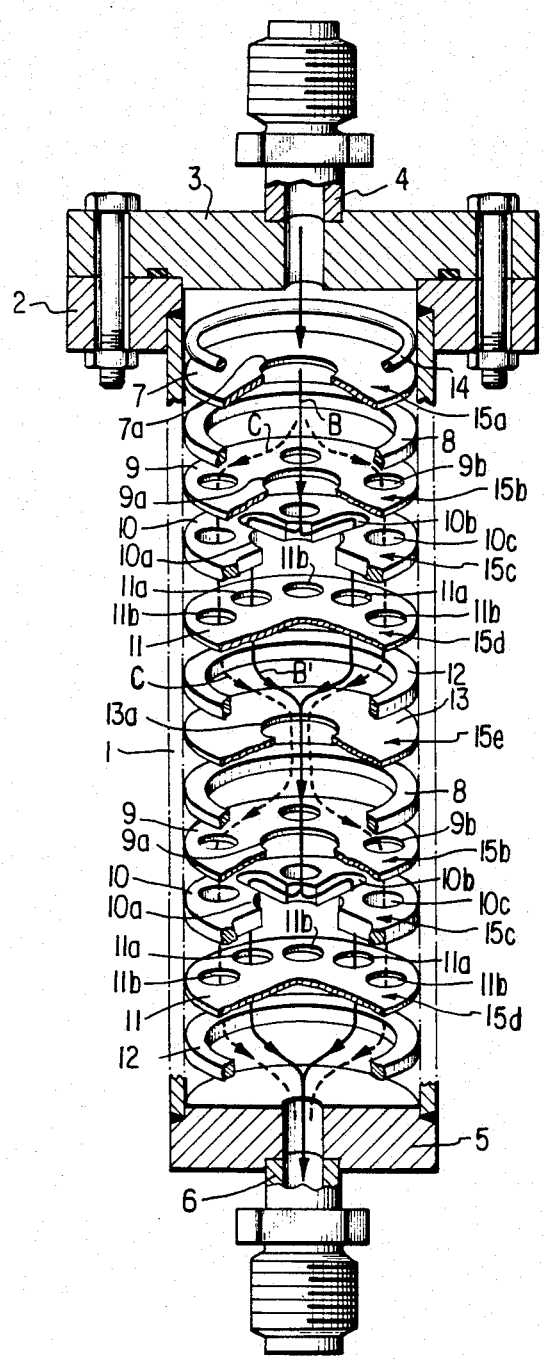
FIG. 1 is an axial sectional view of a preferred embodiment of the invention.

Turning now to FIG. 1, the mixer shown therein has a tube or tubular casing 1, the upper end of which has a radial flange 2 on which there is mounted, by means of bolts, a top plate 3 provided with a central opening joined by a central inlet conduit 4. The lower end of the tube 1 is closed off by a bottom plate 5 which is provided with a central opening joined by an outlet conduit 6.

In the tube 1 a plurality of circular discs are arranged in a parallel oriented axial series. The outer diameter (peripheral shape) of the discs is adapted to the inner diameter (inner cross-sectional outline) of the tube 1. The face-to-face adjoining discs which result in two axially serially arranged mixing stages, are shown at an axial distance from one another for better visibility.

The stream of fluid to be blended is designated with the arrow A and is first admitted to an inlet disc 7 provided with a central opening 7a. As viewed in the direction of the arrow A, the inlet disc 7 is followed downstream by a spacer ring 8 and a distributor disc 9 which has a central opening 9a as well as four peripheral openings 9b. The openings 9a and 9b divide the single stream into a core stream (arrow B) and four edge streams (arrow C).

Downstream of the distributor disc 9 there is arranged a slotted disc 10 which has a central opening 10a from which radially extend four slots 10b to the disc edge. Between the radial slots 10b there are provided four peripheral openings 10c which are aligned with the peripheral openings 9b in the disc 9, while the slots 10b are covered by the solid surface of the disc 9.

Downstream of the disc 10 there is arranged a hole disc 11 provided with eight peripheral holes 11a, 11b which are aligned with the openings 10c and the edge zones of the slots 10b provided in the slotted disc 10.

By virtue of the above structure the core stream B is guided radially outwardly and is divided into four fringe streams B' which, after leaving the hole disc 11 are situated between the fringe streams C.

Downstream of the hole disc 11 there is arranged a spacer ring 12 and a collecting disc 13 which has a central opening 13a which combines centripetally the eight fringe streams B' and C and guides them centrally further downstream. The disc 13 is identical to the disc 7 and thus forms an inlet disc for the next mixer stage which is composed of the same elements as described above. The discs of the successive mixer stage have the same function and structure as those in the first stage and are thus designated with the same reference numerals. Downstream of the space ring 12 of the second mixer stage, however, a collecting disc corresponding to disc 13 is replaced by the bottom plate 5 in which the central outlet conduit 6 is arranged.

The thickness of the slotted disc 10 corresponds to that of the spacer rings 8 and 12, while the other discs are of lesser thickness. An O-ring 14 ensures a close seating of all discs and spacer rings.

In order to immobilize the discs in their mutual angular position, each disc is provided with an aligning bore 15a through 15e, respectively, into which an aligning pin (not shown) may be inserted.

It is to be understood that instead of particular aligning elements 15a through 15e, it is feasible to design the tubular casing and the discs with an unround, matching contour to thus prevent a rotary displacement of the discs. Also, particular spacer rings can be dispensed with if, for example, the discs are provided with axially projecting rims or spacer lugs.

It is further to be understood that while the preferred embodiment described above includes two mixer stages, more than two such stages may be arranged serially behind one another in separate pipes or in a single pipe.

Figure 2:
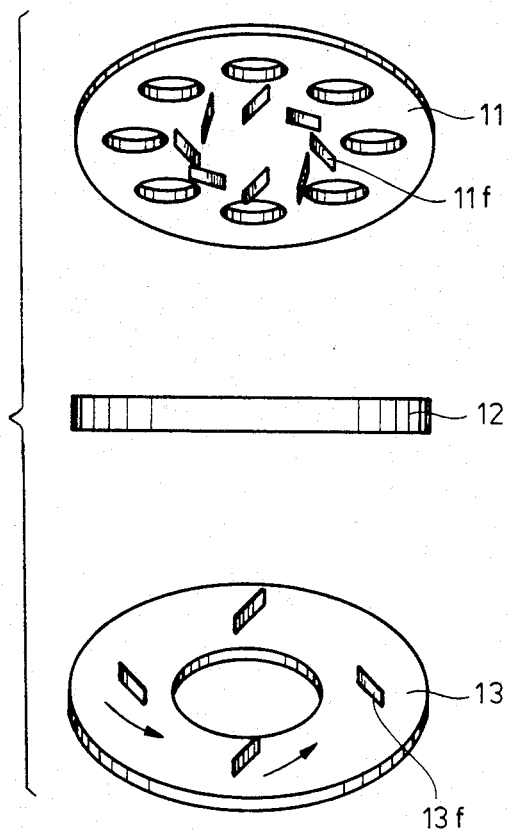
FIG. 2 is an axially exploded perspective view of some of the components of the preferred embodiment.

The provision of web structures is illustrated by FIG. 2 which represents in an enalrged, axially exploded schematic view the downstream side of the hole disc 11, the spacer ring 12, and the upstream side of the collecting disc 13. Guide webs 11f are secured to the downstream oriented face of disc 11, while guide webs 13f are secured to the upstream oriented face of disc 13. The guide webs 11f, 13f induce an azimuthal component in the flow for twisting the fluid flowing radially inwardly from the peripheral openings of the disc 11 towards the central opening of the disc 13.

It will be understood that the above description of the present invention is susceptible to various modifications, changes and adaptations, and the same are intended to be comprehended within the meaning and range of equivalents of the appended claims.

What is claimed is:

1. A motionless mixer for blending a fluid, comprising a tubular casing having a longitudinal axis and an inner cross-sectional contour; a fluid inlet and a fluid outlet axially spaced from one another in said casing and defining a flow direction of the fluid from the fluid inlet to the fluid outlet; a plurality of discs each having opposite faces and throughgoing apertures for allowing passage of the fluid; said discs having a periphery conforming to said inner cross-sectional contour; said discs being supported in said tubular casing in a face-to-face oriented relationship to form an axially extending disc stack; the apertures in said discs forming a core channel and fringe channels in said stack for dividing a fluid stream into a core stream and fringe streams in a first zone, for dividing the core stream into fringe streams in a second zone being downstream of said first zone as viewed in said flow direction and for centripetally combining said fringe streams into a central stream in a third zone being downstream of said second zone; and means for preventing said discs from angular displacements relative to one another; said discs comprising a first disc having a central opening and a plurality of spaced peripheral openings; a second disc adjoining downstream said first disc and having a central opening, a plurality of elongated openings extending radially from the central opening of the second disc, peripheral openings in said second disc situated between the elongated openings thereof; said peripheral openings in said second disc being in axial alignment with respective said peripheral openings of said first disc; a third disc adjoining downstream said second disc and having a plurality of peripheral openings being in alignment with respective said peripheral openings of said second disc and with outer zones of said elongated openings; a fourth disc situated downstream of said third disc and having a central opening; said fourth disc being maintained at an axial distance from said third disc by spacer means; said first disc being situated in said first zone, said second and third discs being situated in said second zone and said fourth discs being situated in said third zone.

2. A motionless mixer as defined in claim 1, further comprising guide webs situated between said third and fourth discs for twisting the fluid flowing radially inwardly from said peripheral openings of said third disc towards the central opening of said fourth disc.

3. A motionless mixer as defined in claim 2, wherein said guide webs are secured to a downstream-oriented face of said third disc.

4. A motionless mixer as defined in claim 2, wherein said guide webs are secured to an upstream-oriented face of said fourth disc.

5. A motionless mixer as defined in claim 1, wherein each opening in each disc extends in a direction perpendicular to the opposite faces of the respective discs.

* * * * *